United States Patent
Reidelbach et al.

(10) Patent No.: US 11,293,486 B2
(45) Date of Patent: Apr. 5, 2022

(54) BEARING BUSHING AND METHOD FOR MANUFACTURING A BEARING BUSHING

(71) Applicant: Umfotec GmbH, Northeim (DE)

(72) Inventors: Marco Reidelbach, Hann. Muenden (DE); Gerald Wedekind, Goettingen (DE); Andreas Fritz, Northeim (DE)

(73) Assignee: UMFOTEC GMBH

( * ) Notice: Subject to any disclaimer, the term of this patent is extended or adjusted under 35 U.S.C. 154(b) by 0 days.

(21) Appl. No.: 17/037,815

(22) Filed: Sep. 30, 2020

(65) Prior Publication Data

US 2021/0095716 A1    Apr. 1, 2021

(30) Foreign Application Priority Data

Sep. 30, 2019   (DE) .................. 10 2019 126 364.6

(51) Int. Cl.

| F16C 27/02 | (2006.01) |
| F16C 33/12 | (2006.01) |
| F16C 33/14 | (2006.01) |
| F16C 33/26 | (2006.01) |
| F16C 33/28 | (2006.01) |

(52) U.S. Cl.
CPC ............ *F16C 27/02* (2013.01); *F16C 33/121* (2013.01); *F16C 33/14* (2013.01); *F16C 33/26* (2013.01); *F16C 33/28* (2013.01); *F16C 2204/10* (2013.01); *F16C 2204/72* (2013.01); *F16C 2361/91* (2013.01); *Y10S 384/912* (2013.01)

(58) Field of Classification Search
CPC ........ F16C 27/02; F16C 33/121; F16C 33/14; F16C 33/26; F16C 33/28; F16C 2204/10; F16C 2204/72; F16C 2220/02; F16C 2361/91; F16C 2240/30; F16C 2220/32; Y10S 394/912; Y10S 384/912

See application file for complete search history.

(56) References Cited

U.S. PATENT DOCUMENTS

| 194,057 A | * | 8/1877 | Smith ................... A63H 27/10 |
| | | | 26/30 |
| 3,356,066 A | * | 12/1967 | Larsson ................... B23K 3/06 |
| | | | 118/109 |
| 4,514,458 A | * | 4/1985 | Thorn ..................... F16F 1/362 |
| | | | 428/222 |

(Continued)

FOREIGN PATENT DOCUMENTS

| CN | 1289379 A | * | 3/2001 | ............. F16C 33/20 |
| CN | 104583621 A | * | 4/2015 | ............. F16C 33/28 |

(Continued)

OTHER PUBLICATIONS

German Office Action dated May 28, 2020.

*Primary Examiner* — Marcus Charles
(74) *Attorney, Agent, or Firm* — Gerald E. Hespos; Michael J. Porco; Matthew T. Hespos

(57) ABSTRACT

A bearing bushing (1) and to a method for manufacturing a bearing bushing are provided. The bearing bushing includes a wire article (2) formed from knitted wire mesh or knitted wire fabric (6) and compressed into a dimensionally stable compressed product (3). The bearing bushing can be provided for supporting a throttle valve used in high-temperature applications. The wire article (2) is formed from a stainless steel. Existing voids (10) of the compressed product (3) are filled with solder (4).

9 Claims, 4 Drawing Sheets

(56) References Cited

U.S. PATENT DOCUMENTS

| | | | | |
|---|---|---|---|---|
| 4,559,249 | A | * 12/1985 | Arigaya | B29D 99/0053 |
| | | | | 264/258 |
| 5,305,941 | A | * 4/1994 | Kent | B23K 3/08 |
| | | | | 228/19 |
| 6,848,828 | B2 | * 2/2005 | Nishijima | F16C 27/02 |
| | | | | 384/106 |
| 10,584,748 | B2 | 3/2020 | Pinnekamp et al. | |

FOREIGN PATENT DOCUMENTS

| | | | |
|---|---|---|---|
| CN | 109769380 A * | 5/2019 | |
| DE | 3716027 A1 * | 11/1988 | ............ F16C 33/201 |
| DE | 3811144 C1 * | 12/1989 | ............ B23K 31/02 |
| DE | 19604221 A1 * | 8/1997 | ............ F16C 33/18 |
| DE | 197 01 178 | 7/1998 | |
| DE | 10 2008 020 870 | 10/2009 | |
| DE | 10 2012 013 263 | 1/2014 | |
| DE | 10 2016 203 794 | 9/2017 | |
| DE | 10 2016 110 858 | 12/2017 | |
| EP | 0759502 A1 * | 2/1997 | ............ F16L 51/025 |
| EP | 3534022 A1 * | 9/2019 | ............ F16C 27/02 |
| GB | 821472 A * | 10/1959 | ............ F16C 33/28 |
| JP | 3032076 B2 * | 4/2000 | ............ F16C 33/206 |
| JP | 4023696 B2 * | 12/2007 | ............ E01D 15/04 |
| WO | WO-03048594 A1 * | 6/2003 | ............ F16C 33/04 |

\* cited by examiner

BEARING BUSHING AND METHOD FOR MANUFACTURING A BEARING BUSHING

BACKGROUND

Field of the Invention

The invention relates to a bearing bushing consisting of a wire article formed from knitted wire mesh or knitted wire fabric and compressed into a dimensionally stable compressed product, the bearing bushing being provided for supporting a throttle valve used in high-temperature applications, wherein the wire article is formed from a stainless steel.

The invention further relates to a method for manufacturing a bearing bushing, wherein, in a first series of steps, a wire article made of a stainless steel knitted wire mesh or wire fabric tube is compressed into a dimensionally stable compressed product having the outer shape of the bearing bushing.

Related Art

Bearing bushings and a method for manufacturing the same are known from DE 197 01 178 C2.

DE 10 2016 110 858 A1 discloses a three-layer plain bearing having a bearing base body made of a metallic material, an intermediate layer made of a wire fabric, a wire mesh or a knitted wire mesh or fabric and a plain bearing layer made of a non-metallic material. The knitted wire fabric may be made of stainless steel and/or copper, and is applied to the metallic bearing base body by soldering. A copper foil coated on each side with a silver alloy may be used as solder for soldering the intermediate layer to the bearing base body. Alternatively, the solder may be electroplated onto either the bearing base body or the intermediate layer. The soldering may take place by heating above the melting temperature of the material of the intermediate layer and under stabilizing pressure. In turn, the plain bearing layer, which is made of polyether ether ketone (PEEK), is applied onto the intermediate layer by melting to achieve good adhesion to the bearing base body. The disadvantage of this known device is that the plain bearing layer is made of a plastic with a melting temperature of 335° C., which is below the operating temperature of a throttle valve used in high-temperature applications. Thus, the known device is not suitable for use as a bearing in a throttle valve operated in high-temperature applications.

DE 10 2016 203 794 B4 discloses a bearing bushing that consists of a wire article formed from a knitted wire mesh or knitted wire fabric and is used to support a throttle valve in high-temperature applications. A disadvantage of this design is that a bearing bushing formed as a wire article is not air-tight and can only be used on one end of a bearing shaft that, in the longitudinal direction of the housing supporting the bearing, is sealed in an air-tight manner by the housing.

DE 10 2008 020 870 A1 discloses a compression molded part that is permeable to gas due to its knitted design.

DE 10 2016 203 794 B4 discloses a bearing bushing formed from a solid material that is arranged at an end of a bearing shaft and is adapted to be sealed in an air-tight manner. The bearing bushing is designed as a radial bearing, and is elongated in the direction of the longitudinal axis of the bearing shaft to avoid having exhaust gas escape from the valve housing. The disadvantage of this bearing bushing made of solid material is that it allows only for small tolerances. If the tolerances are too great, the hot gas can escape if the outer diameter is too small or the inner diameter of the bearing bushing is too large. If the inner diameter of the bearing bushing is too small, squeaking noises may occur due to mechanical contact.

DE 10 2012 013 263 B4 discloses a wire article made of a dimensionally stable compressed product. The compressed product is formed from a tube section cut to length from a tube made of knitted wire mesh or knitted wire fabric. The knitted wire fabric has a plurality of stitch courses arranged in the tube longitudinal direction. This disclosed wire article and the method known from this publication are not designed to be air-tight.

DE 197 01 178 C2 discloses a knitted wire mesh made from stainless steel or copper in the form of a mesh-forming knitted tube that first is rolled up and then compressed into a shaped article. The tube may also first be folded flat into a half tube, wrapped about a mandrel in multiple layers and then compressed in the direction of the mandrel axis. Alternatively, the knitted tube may be rolled up in the direction of its longitudinal axis and then compressed. The disadvantage of this known device is also that it is not designed to be air-tight.

It is an object of the present invention to design a bearing bushing comprising a stainless steel wire article formed from knitted wire mesh or knitted wire fabric and compressed into a dimensionally stable compressed product, the bearing bushing being provided for supporting a throttle valve used in high-temperature applications such that, on the one hand, it is designed to be highly air-tight to prevent exhaust gas leakage and, on the other hand, has good sliding properties.

SUMMARY

Surprisingly, it has been found that when filling the voids of the compressed product with solder the bearing bushing does not only become highly air-tight to air or exhaust gas but also maintains good running and sliding properties.

According to one embodiment, the wire article is formed from austenitic, acid-resistant Cr—Ni steel with the material number 1.4828 (X15CrNiSi20-12), for example. Filling the voids of the stainless steel compressed product with copper solder has proven to be particularly advantageous. Thus, the stainless steel compressed product has a higher wear resistance and makes lower tolerances as compared with a bearing bushing made of solid material possible. Good sliding properties of copper take effect by depositing copper solder in the voids of the compressed product, while at the same time "squeaking noises" are prevented.

According to a further embodiment, the wire article comprises or consists of a tube section cut to length from a tube formed from the knitted wire mesh or knitted wire fabric. The knitted wire mesh or knitted wire fabric has a plurality of stitch courses arranged in the tube longitudinal direction.

The invention also relates to a method that includes providing a wire article made of a tube section of a stainless steel knitted wire mesh or wire fabric tube and then compressing that wire article into a dimensionally stable compressed product having the outer shape of the bearing bushing. The method then includes feeding the compressed product is fed into a continuous furnace and soaked with solder in an annealing process.

By feeding the compressed product into a continuous furnace and soaking the compressed product with solder in an annealing process, the voids of the compressed product made of a knitted wire mesh or knitted wire fabric are filled with solder.

The method may further include: introducing the compressed product into a ceramic mold; feeding the mold with the introduced compressed product into the continuous furnace; soaking the compressed product with solder in the annealing process of the continuous furnace, and removing the solder-saturated compressed product from the mold as bearing bushing.

Introducing the compressed product into a ceramic mold and feeding the mold with the introduced compressed product into the continuous furnace ensures the dimensional accuracy of the bearing bushing and facilitates easy removal of the compressed product soaked with solder, i.e. the bearing bushing, from the ceramic mold.

According to another development of the invention, the method includes: knitting or warp-knitting a tube having a plurality of stitch courses arranged next to each other in the tube longitudinal direction, separating a tube section from the tube, and compressing the tube section into the wire article.

According to a further embodiment, the method includes folding over a first end of the tube section after separating a tube section from the tube. This results in a tube section with increased wall thickness and facilitates the compressing process.

Further details and advantages of the invention are given in the following specific description and the drawings.

DETAILED DESCRIPTION

Figure 1:
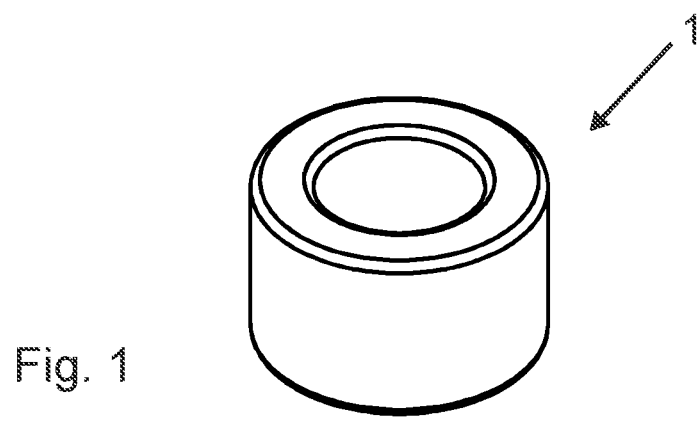
FIG. 1 shows a three-dimensional representation of a bearing bushing.
Figure 2:
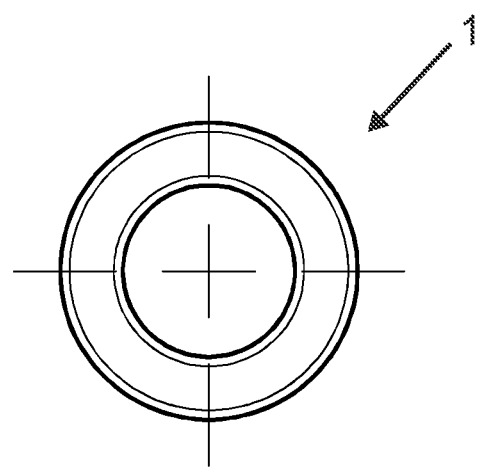
FIG. 2 is a top plan view of the bearing bushing from FIG. 1.
Figure 3:
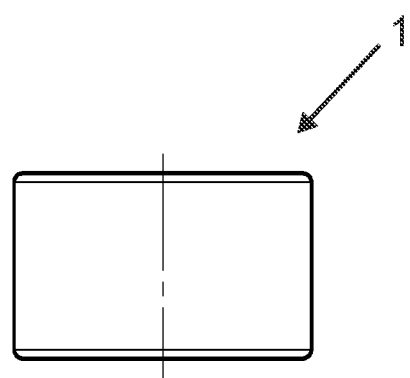
FIG. 3 is a side view of the bearing bushing from FIG. 1.
Figure 4:
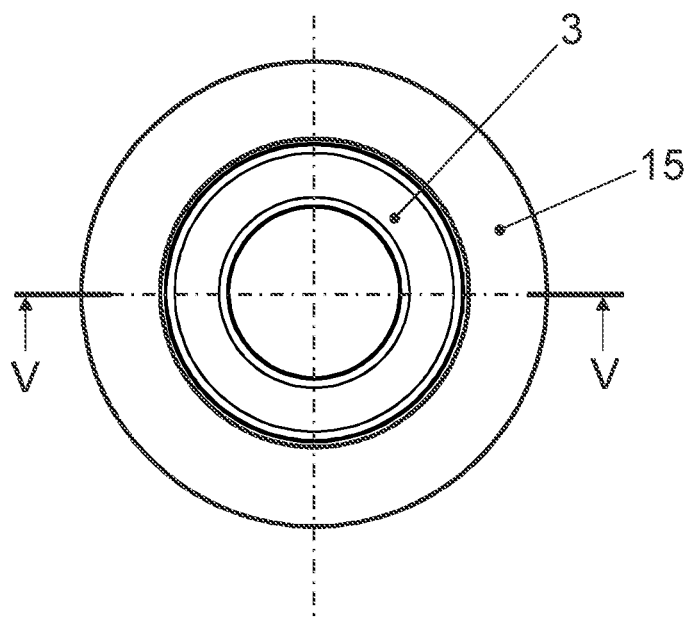
FIG. 4 is a top plan view of a mold with introduced compressed product.
Figure 5:
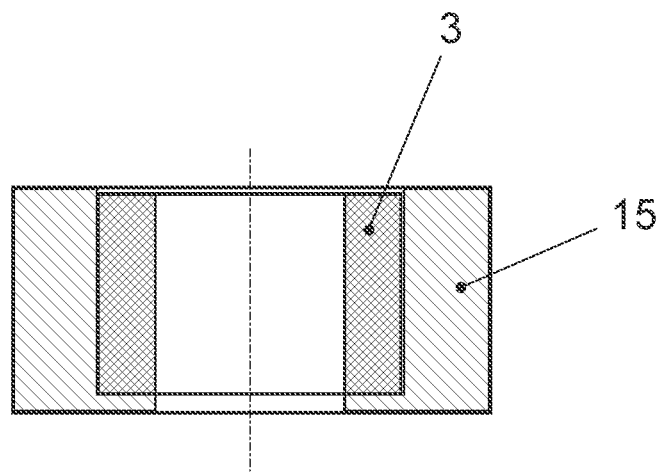
FIG. 5 is a side view of the mold with introduced compressed product from FIG. 4, cut along line V-V.
Figure 6:
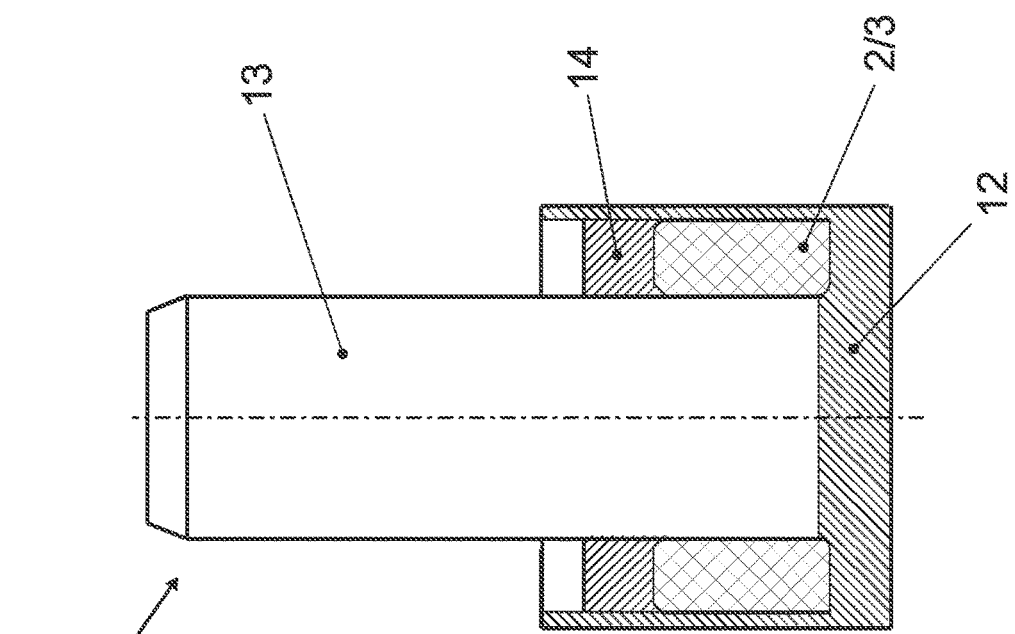
FIG. 6 is a cross-sectional side view of a pressing device with inserted tube section.
Figure 7:
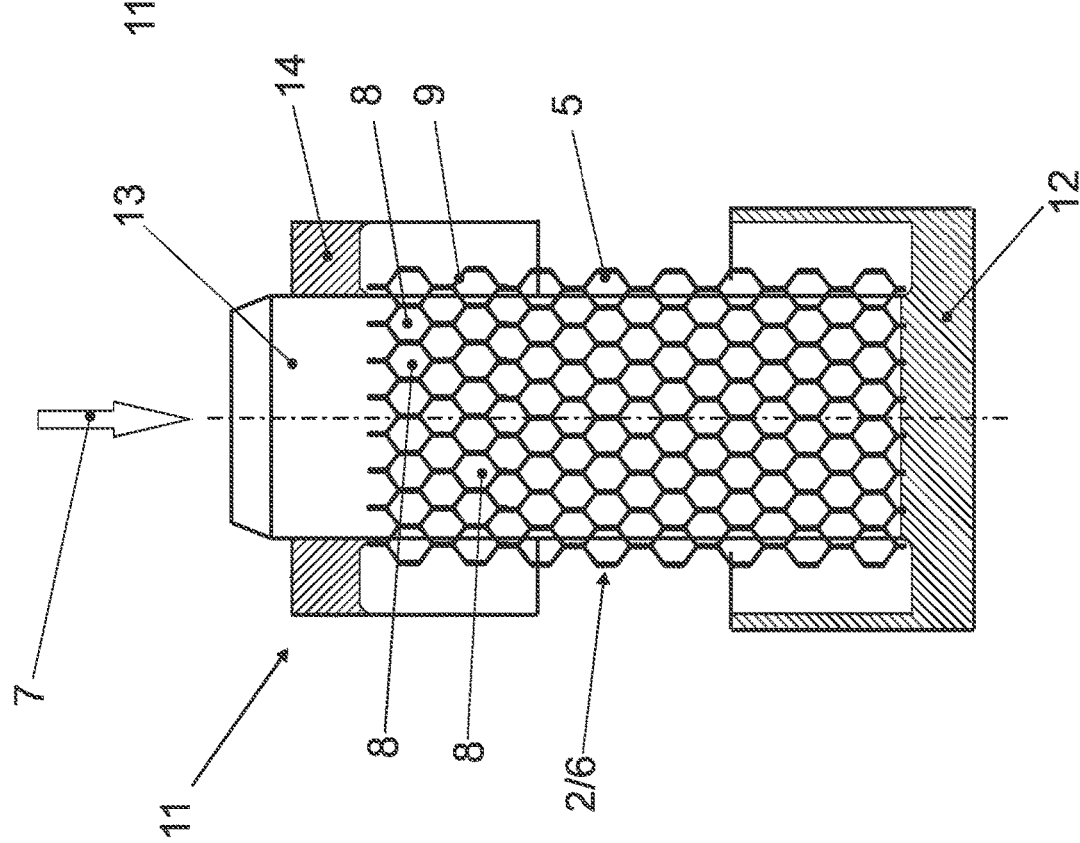
FIG. 7 is a cross-sectional side view of the pressing device from FIG. 6 with a compressed wire article.
Figure 8:
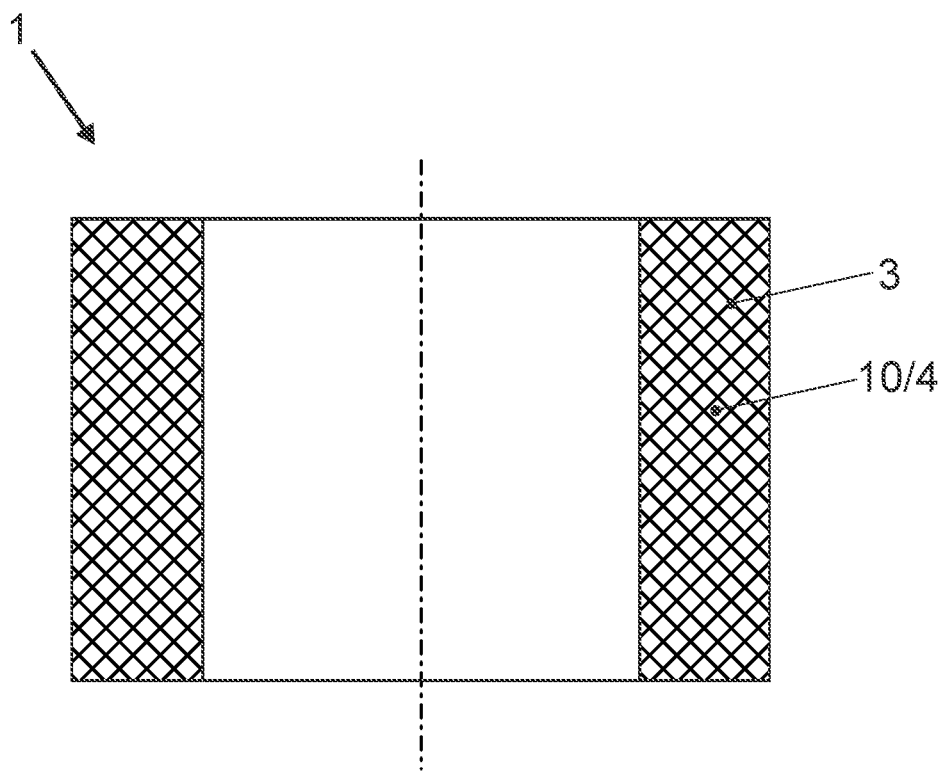
FIG. 8 is an enlarged cross-sectional side view of the bearing bushing from FIG. 3.

A bearing bushing 1 comprises or consists of a wire article 2 that has been compressed into a compressed product 3 where voids 10 of the compressed product 3 are filled with solder 4.

The wire article 2 comprises or consists of a tube section 5 cut to length from a tube formed from a knitted wire mesh or knitted wire fabric 6. The knitted wire mesh or knitted wire fabric 6 has a plurality of stitch courses 8 arranged in the tube longitudinal direction 7.

The wire articles 2 advantageously can be used for bearing bushings 1 of throttle valves (not shown) in high-temperature applications by forming the wires 9 from austenitic, acid-resistant Cr—Ni steel. For example, stainless steels wire with material number 1.4828 (X15CrNiSi20-12) and a diameter of 0.23 mm may be used. Filling the voids 10 of the stainless steel compressed product 3 with copper solder has proven to be particularly advantageous.

In a first series of steps for manufacturing the bearing bushing 1, the wire article 2 made of a tube section 5 of a stainless steel knitted wire mesh or wire fabric tube initially is compressed into a dimensionally stable compressed product 3 having the outer shape of the bearing bushing 1.

The tube section 5 is produced in a manner known in the art from the wire 5 by knitting or warp-knitting, having a plurality of stitch courses 8 arranged next to each other in the tube longitudinal direction 7. The wire article 2 made of the tube section 5 is compressed into the compressed product 3 in a forming device 11. As known in the art, the forming device 11 consists of an annular bottom part 12 having a central mandrel 13, over which the tube section 5 is slid. Finally, the tube section 5 is compressed into the compressed product 3 of the wire article 2 with a pressing die 14 which is pressed over the mandrel 13 against the bottom part 12.

In a second series of steps the compressed product 3 is fed into a continuous furnace (not shown) and soaked with solder 4 in an annealing process.

To ensure high dimensional accuracy, the compressed product 3 may be introduced into a ceramic mold 15 and then fed into the continuous furnace as a unit. After soaking the compressed product 3 with solder 4, preferably copper solder, in the annealing process of the continuous furnace, the solder-saturated compressed product 3 is removed from the mold 15 as finished bearing bushing 1.

Of course, the embodiments discussed in the specific description and shown in the figures are only illustrative exemplary embodiments of the present invention. In light of the present disclosure, the person skilled in the art is given a wide range of variation possibilities.

REFERENCE SIGN LIST

1 Bearing bushing
2 Wire article
3 Compressed product
4 Solder
5 Tube section
6 Knitted wire mesh/knitted wire fabric
7 Tube longitudinal direction
8 Stitch course
9 Wire
10 Void of 3
11 Forming device
12 Bottom part of 11
13 Mandrel
14 Pressing die of 11
15 Mold

What is claimed is:

1. A bearing, bushing (1) comprising a wire article (2) formed from a knitted wire mesh or knitted wire fabric (6) compressed into a dimensionally stable compressed product (3), the bearing bushing being provided for supporting a throttle valve used in high-temperature applications, wherein:
   the wire article (2) is formed from a stainless steel,
   existing voids (10) of the compressed product (3) are filled with solder (4), and
   the wire article (2) comprises a tube section (5) cut to length from a tube formed from the knitted wire mesh or knitted wire fabric (6), the knitted wire mesh or knitted wire fabric (6) has a plurality of stitch courses (8) arranged in a longitudinal direction (7) of the tube.

2. The bearing bushing (1) of claim 1, wherein the wire article (2) is formed from austenitic, acid-resistant Cr—Ni steel.

3. The bearing bushing (1) of claim 1, wherein
the voids (10) of the compressed product (3) are filled with copper solder.

4. A method for manufacturing a bearing, bushing (1) comprising:
performing a first series of steps that includes:
providing a wire article (2) made of a tube section (5) of a stainless steel knitted wire mesh or wire fabric tube; and
compressing the wire article (2) into a dimensionally stable compressed product (3) having an outer shape of the bearing bushing (1);
performing a second series of steps that include:
feeding the compressed product (3) into a continuous furnace; and
soaking the compressed product (3) with solder (4) in an annealing process.

5. The method of claim 4, wherein the second series of steps further includes:
introducing the compressed product (3) into a ceramic mold (15);
the step of feeding the compressed product (3) into a continuous furnace includes feeding the mold (15) with the compressed product (3) therein into the continuous furnace;
the step of soaking the compressed product (3) with solder (4) in an annealing process of the continuous furnace is carried out to provide a solder-saturated compressed product (3); and
removing the solder-saturated compressed product (3) from the mold (15) as the bearing bushing (1).

6. The method of claim 5, wherein the first series of steps includes:
knitting or warp-knitting a tube having a plurality of stitch courses (8) arranged next to each other in a tube longitudinal direction (7),
separating a tube section (5) from the tube, and
compressing the tube section (5) into the wire article (2).

7. The method of claim 6, further comprising folding over the tube section (5) after the tube section (5) has been separated from the tube and before compressing the tube section (5) into the wire article (2).

8. The method of claim 4, wherein the first series of steps includes:
knitting or warp-knitting a tube having a plurality of stitch courses (8) arranged next to each other in a tube longitudinal direction (7),
separating a tube section (5) from the tube, and
compressing the tube section (5) into the wire article (2).

9. The method of claim 8, further comprising folding over the tube section (5) after the tube section (5) has been separated from the tube and before compressing the tube section (5) into the wire article (2).

* * * * *